H. G. JOHNSON.
KEY RING.
APPLICATION FILED NOV. 29, 1920.
1,402,072.
Patented Jan. 3, 1922.
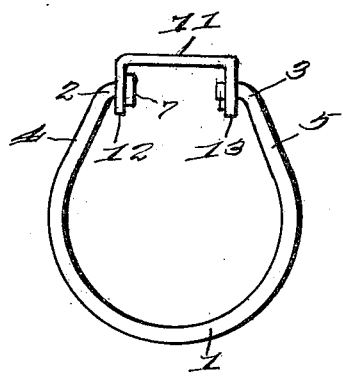
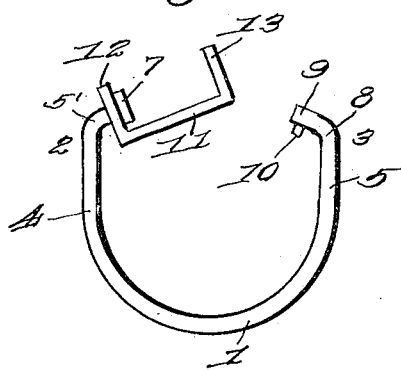
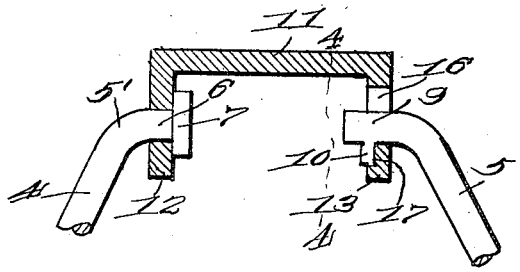
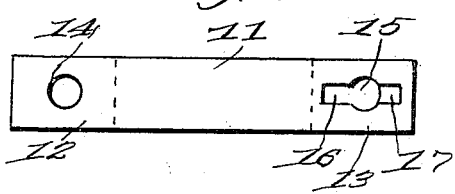
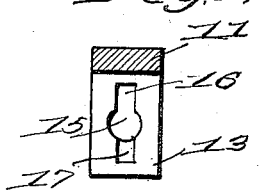
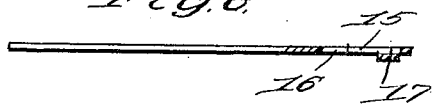
Inventor
Hertug G. Johnson
Carl M. Crawford
Attorney

UNITED STATES PATENT OFFICE.

HERLUF G. JOHNSON, OF PORTLAND, OREGON.

KEY RING.

1,402,072.  Specification of Letters Patent.  Patented Jan. 3, 1922.

Application filed November 29, 1920. Serial No. 427,183.

*To all whom it may concern:*

Be it known that I, HERLUF G. JOHNSON, a citizen of the United States, residing at Portland, in the county of Multnomah and State of Oregon, have invented new and useful Improvements in Key Rings, of which the following is a specification.

This invention relates to improvements in key rings of that character in which the ring is separable to permit of the keys to be threaded onto or off therefrom. The present invention is an improvement on the key ring shown in my prior patent dated April 27, 1920, No. 1,338,085.

One of the objects of this invention is to provide a novel means whereby the bow or ring portion may be closed or held closed by its retaining means without the necessity of providing a threaded connection, as in my prior patent and other patents. A further object is to provide a retainer of a greatly simplified construction.

In accordance with my present invention, the bow portion of the device is formed of spring metal and is tempered or otherwise constructed in a manner to cause the bow terminals to spring or spread apart when released from connection with each other.

A further feature consists in providing a retainer which may be rotatively adjusted to permit of connection therewith of the bow ends and which may be thereafter rotatively adjusted to make the connection secure, the resiliency of the bow spring co-acting with the retainer to make the connection secure.

A further feature consists in providing the retainer with a special portion for positive co-action with the bayonet terminal of one bow end whereby the connection will not be dependent upon friction but will be a positive connection.

Other features and objects of this invention will be more fully described in connection with the accompanying drawing and will be more particularly pointed out in and by the appended claims.

In the drawing:—

Figure 1 is a view in elevation of one form of my improved key ring with the retainer shown in a retaining position.

Figure 2 is a similar view with the retainer disconnected and showing one terminal free whereby keys may be threaded onto or off therefrom.

Figure 3 is a view of the upper portion of the key ring on an enlarged scale with the retainer in section.

Figure 4 is a sectional view on line 4—4 of Figure 3.

Figure 5 is a view in elevation of the blank of which the retainer is stamped or formed.

Figure 6 is an edge view thereof with a portion in section, showing a modified form of the retainer.

Like characters of reference designate similar parts throughout the different figures of the drawing.

The construction has been illustrated in the drawing on an exaggerated scale and with the parts of heavy construction to more clearly show the formation but it will be understood as regards the U-shaped retainer, the same will probably be of thin sheet metal.

Next referring more particularly to the device as shown, 1 designates the bow of the ring which is formed of resilient material which is tempered or otherwise constructed to cause the end portions 2 and 3 to normally spread or spring apart from each other as shown in Figure 2, when released. The bow 1 is shown substantially semi-circular, this portion terminating in relatively straight ends 4 and 5 which form a distinct feature of the invention not only because they facilitate threading of the keys onto and off from the bow but also by reason of the more effective resilient action which I obtain by straightening the terminals of the bow. While this is an advantageous feature, it is not an essential feature.

Terminal 4 is bent at 5' to provide a shank 6. A head 7 is formed on the extreme end thereof. The remaining end 3 is bent at 8 to form a shank 9. A projection 10, forms with the cylindrical end 9, a terminal of bayonet construction, the purpose of which will presently appear.

My improved retaining means is of U-shaped form, as shown, the bight 11 having legs 12 and 13. Leg 12 is provided with an opening 14 through which the shank 6 projects, the head 7 with the bend 5' retaining the leg 12 in swiveled connection with end portion or terminal 4 so that the retainer may be rotatively adjusted thereon. It is not a special feature of this invention to assemble the parts in any special manner, therefore the head 7 may be later applied or may be initially formed on the shank 6, or the retainer may be threaded onto the bow over the remaining end 5. The remaining leg 13 is provided with an opening 15 for the shank 9. A key portion or elongation of the opening 15 is provided and shown at 16, thereby making the same a bayonet opening. With the retainer in the position shown in Figure 2, the portions 3 and 4 may be compressed and the key 10 will pass through the bayonet key portion 16. Then the retainer will be rotatively adjusted into the position in Figure 1 thereby causing the key 10 to engage an imperforate portion of the leg 13 whereby with the resilient spreading action of the bow end the parts will be securely and frictionally held in connection. The friction will be such that the retainer would not ordinarily be moved or shifted to dispose its key portions 16 in registry with portion 10. However, it is a feature of my invention to provide an even more stable connection, and to this end, the leg 13 is provided with a locking recess 17 which may be off-set from the material or blank, as shown in Figure 6, or which may be recessed into the material as shown in Figure 3. At any rate, when the retainer is in a position shown in Figure 3, the key 10 will seat in the recess 17 and thereby more securely hold the retainer against accidental displacement.

In practice, the retainer will probably be formed of a sheet blank of material, as shown in Figure 5, the openings and recess being punched or formed in the initial stamping operation. The second operation will bend the legs to form, as shown in Figure 1.

It will thus be seen that I have devised a very simple form of key ring in which threaded connections are entirely eliminated thereby greatly reducing the cost of manufacture as compared to my earlier patent. However, for some utilities, the higher priced ring of my former patent may be preferable, the two rings being designed to appeal to different classes of purchasers.

It is believed that the novelty and utility of my invention will be fully understood from the foregoing description, and while I have herein shown and described one form of my invention, I do not wish to be limited thereto except for such limitations as the claims may import.

I claim:—

1. A key ring comprising in combination, a spring bow on which the keys are adapted to be threaded and having terminal end portions normally spaced in relatively wide open relation with respect to each other whereby the keys may be threaded onto and off from at least one terminal end portion, and means for connecting said end portions comprising a U-shaped retainer having one leg thereof in permanent swiveled connection with one end portion, the remaining leg having a bayonet opening, and the remaining terminal portion having a bayonet end for connection with said remaining leg whereby said retainer may be rotated to dispose its bayonet portion out of registry with the key of said terminal portion, the spreading resiliency of said end portions serving to frictionally hold said retainer in a retaining position.

2. A key ring comprising in combination, a spring bow on which the keys are adapted to be threaded and having terminal end portions normally spaced in relatively wide open relation with respect to each other whereby the keys may be threaded onto and off from at least one terminal end portion, and means for connecting said end portions comprising a U-shaped retainer having one leg thereof in permanent swivel connection with one terminal end portion, the remaining leg having a bayonet opening and provided with a locking recess in radially different position from the key part of said bayonet opening, and the remaining terminal portion having a bayonet end for connection with the bayonet opening of said retainer leg whereby the retainer may be rotatively adjusted to dispose said locking recess in registry with the key part of said terminal end, the resiliency of the bow holding said key part in engagement with said recess.

3. A key ring including a bow or loop for the keys having a curved or semicircular bight portion and having straight end portions, said bow being formed of spring metal tempered to cause its straight ends to normally separate from each other, and means for connecting said ends when the latter are contracted.

In testimony, that I claim the foregoing as my own, I hereby affix my signature.

HERLUF G. JOHNSON.